(12) United States Patent
Ma et al.

(10) Patent No.: US 12,162,263 B2
(45) Date of Patent: Dec. 10, 2024

(54) LEATHER SMART CARD

(71) Applicant: ZHUHAI GLOBAL TIMES TECHNOLOGY CO., LTD., Zhuhai (CN)

(72) Inventors: Jiming Ma, Zhuhai (CN); Xinwen Ye, Zhuhai (CN); Guixin Tu, Zhuhai (CN); Yangwei Ou, Zhuhai (CN)

(73) Assignee: ZHUHAI GLOBAL TIMES TECHNOLOGY CO., LTD, Zhuhai (CN)

( * ) Notice: Subject to any disclaimer, the term of this patent is extended or adjusted under 35 U.S.C. 154(b) by 0 days.

(21) Appl. No.: 18/370,892

(22) Filed: Sep. 21, 2023

(65) Prior Publication Data
US 2024/0100807 A1 Mar. 28, 2024

(30) Foreign Application Priority Data
Sep. 28, 2022 (CN) .......................... 202222586961.8

(51) Int. Cl.
| | |
|---|---|
| *B32B 9/04* | (2006.01) |
| *B32B 5/02* | (2006.01) |
| *B32B 7/12* | (2006.01) |
| *B32B 9/02* | (2006.01) |
| *B32B 27/12* | (2006.01) |
| *B32B 27/30* | (2006.01) |

(Continued)

(52) U.S. Cl.
CPC ............... *B32B 9/045* (2013.01); *B32B 5/02* (2013.01); *B32B 7/12* (2013.01); *B32B 9/025* (2013.01); *B32B 9/047* (2013.01); *B32B 27/12* (2013.01); *B32B 27/304* (2013.01); *B32B 27/306* (2013.01); *B32B 27/36* (2013.01); *B32B 27/40* (2013.01); *G06K 19/07749* (2013.01); *B32B 2250/05* (2013.01); *B32B 2250/42* (2013.01); *B32B 2262/062* (2013.01); *B32B 2274/00* (2013.01); *B32B 2307/536* (2013.01); *B32B 2307/7376* (2023.05); *B32B 2425/00* (2013.01)

(58) Field of Classification Search
CPC ............... G06K 19/07; G06K 19/0723; G06K 19/07749; B32B 9/025; B32B 9/045; B32B 9/047; B32B 5/02; B32B 7/12; B32B 27/12; B32B 27/304; B32B 27/306; B32B 27/40
See application file for complete search history.

(56) References Cited

U.S. PATENT DOCUMENTS

2015/0339564 A1* 11/2015 Herslow ................. B32B 15/20
156/60

FOREIGN PATENT DOCUMENTS

CN 210123564 U * 3/2020

* cited by examiner

*Primary Examiner* — Laura A Gudorf
(74) *Attorney, Agent, or Firm* — Bayramoglu Law Offices LLC

(57) ABSTRACT

A leather smart card is provided. The leather smart card includes a hard layer. A radio frequency identification (RFID) chip and a communication coil are disposed in the hard layer, and the RFID chip is electrically connected to the communication coil. The smart card further includes a leather layer and a soft layer. The soft layer is disposed on two back-to-back sides of the hard layer, and the leather layer is disposed on the side of the soft layer facing away from the hard layer. A material of the soft layer includes an ethylene-vinyl acetate copolymer, and a thickness of the soft layer is 0.2 mm to 0.5 mm. Consequently the leather smart card is not only aesthetic and waterproof, but also greatly improves comfort of using the smart card.

12 Claims, 2 Drawing Sheets

(51) Int. Cl.
*B32B 27/36* (2006.01)
*B32B 27/40* (2006.01)
*G06K 19/077* (2006.01)

LEATHER SMART CARD

CROSS REFERENCE TO THE RELATED APPLICATIONS

This application is based upon and claims priority to Chinese Patent Application No. 202222586961.8, filed on Sep. 28, 2022, the entire contents of which are incorporated herein by reference.

TECHNICAL FIELD

The present application relates to the field of smart cards, and in particular, to a leather smart card.

BACKGROUND

With the constant update of smart card technologies, various magnetic cards and IC cards are widely used in fields such as finance, social security, public transportation, intelligent building security system, and commercial members. Among the existing types of smart cards, most of materials used are plastic materials such as PVC, ABS, and PETG. The appearance of such smart cards is monotonous and not aesthetic, and it is difficult to satisfy the cardholders' pursuit of personalized products.

An existing smart card with metal gloss includes a card base. The card base includes a front protective film, a front transparent printing layer, a metal layer, a pre-laminated sheet, a back transparent printing layer, and a back protective film that are sequentially stacked. An IC chip is disposed on the front surface of the card base, and the IC chip sequentially passes through the front protective film, the front transparent printing layer, and the metal layer and then is electrically connected to a coil in the pre-laminated sheet. However, because the metal layer is disposed on the smart card, the surface temperature is excessively high in summer, and the surface temperature is excessively low in winter. Thus, user experience is relatively poor, a hand feeling is stiff during use, and comfort is not high.

SUMMARY

To resolve the foregoing problems in the prior art, an objective of the present application is to provide a leather smart card with a comfortable handfeel.

To achieve the foregoing objective, the leather smart card described in this solution includes a hard layer, a radio frequency identification (RFID) chip and a communication coil are disposed in the hard layer, and the RFID chip is electrically connected to the communication coil; the smart card further includes a leather layer and a soft layer; the soft layer is disposed on two back-to-back sides of the hard layer, and a leather layer is disposed on each side of the soft layer facing away from the hard layer.

Consequently, the leather layer disposed outside the smart card can not only improve handfeel and visual aesthetics, but also improve waterproof performance of the smart card. The disposed soft layer can further improve the comfort of holding the smart card.

In a further solution, a material of the soft layer comprises an ethylene-vinyl acetate copolymer, and a thickness of the soft layer is 0.2 mm to 0.5 mm.

Consequently, the soft layer is made of an ethylene-vinyl acetate copolymer material, and has good waterproof property, elasticity, and toughness. Therefore, comfort and waterproof performance in use can be improved. In addition, the soft layer made of the ethylene-vinyl acetate copolymer material does not need to be bonded to the hard layer by using an adhesive film layer, thereby simplifying a process.

Further, a material of the soft layer includes cotton fibers. The leather smart card further includes an adhesive film layer, and the adhesive film layer is located between the soft layer and the hard layer.

Consequently, the soft layer using cotton fibers can maintain humidity balance of the leather layer, and has a good thermal insulation effect, thereby effectively improving use comfort of the leather smart card.

In a further solution, a material of the adhesive film layer comprises thermoplastic polyurethane elastomer rubber.

Consequently, the waterproof performance of the leather smart card can be improved by using the adhesive film layer of a thermoplastic polyurethane elastomer rubber material.

In a further solution, a thickness of the soft layer is 0.1 mm; and the thickness of the adhesive film layer is 0.1 mm to 0.3 mm.

Consequently, the thicknesses of the cotton fibers and the adhesive film layer can ensure that the performance of the leather smart card remains unchanged, and ensure that the leather smart card is not visually overweight.

In a further solution, a decorative sewing thread is disposed on the leather layer, and a thread end of the decorative sewing thread is located on a side of the leather layer facing the soft layer.

Consequently, the disposed decorative thread and the thread end being disposed on the side of the leather layer facing the soft layer ensure that the visual aesthetics of the smart card can be further improved.

In a further solution, an edge sealing layer is disposed on an edge of the smart card, and a material of the edge sealing layer comprises polyurethane.

Consequently, the edge of the leather smart card is sealed by using a material such as polyurethane, which not only improves waterproof and sealing performance of the leather smart card, but also makes the smart card more aesthetic.

In a further solution, a material of the hard layer comprises any one of polyvinyl chloride, polyethylene terephthalate, or polylactic acid.

In a further solution, a material of the leather layer comprises polyurethane, and a thickness of the leather layer is 0.4 mm to 0.8 mm.

Consequently, the leather layer adopts this thickness, ensuring structural strength of the leather layer, and ensuring aesthetics of the smart card.

In conclusion, the leather smart card in this solution is aesthetically appealing and has a classy appearance, providing more comfortable user experience.

DETAILED DESCRIPTION OF THE EMBODIMENTS

Figure 1:
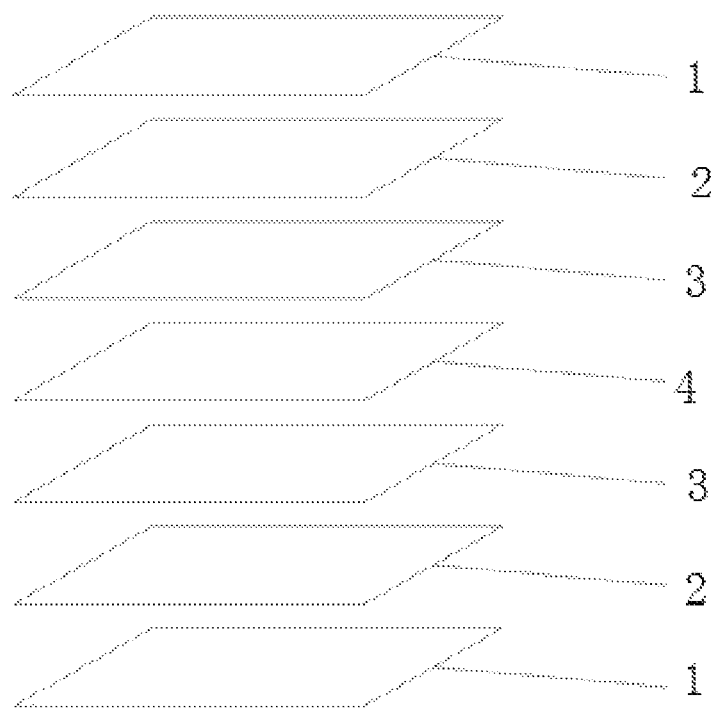
FIG. 1 is a schematic structural diagram of a leather smart card according to an embodiment of the present application.
Figure 2:
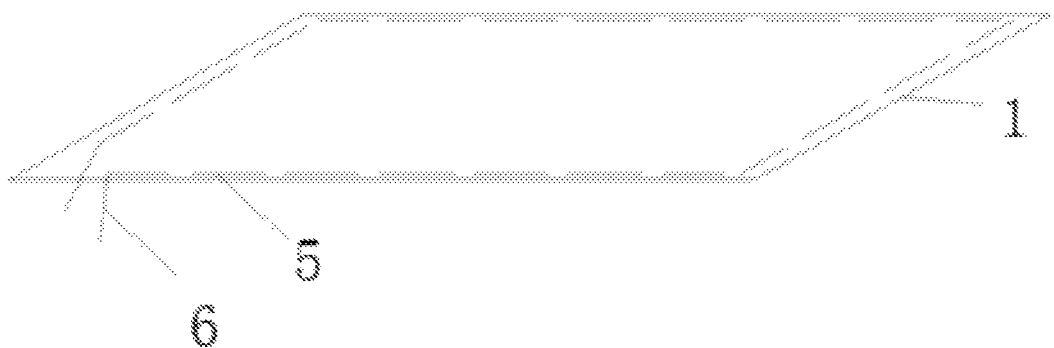
FIG. 2 is a schematic structural diagram of a leather layer according to an embodiment of the present application.

Referring to FIG. 1 and FIG. 2, this embodiment provides a leather smart card with multiple layers that includes leather layers 1, soft layers 2, and a hard layer 4. The hard layer 4 is located at the center of the smart card. The soft layer 2 is disposed on two back-to-back sides of the hard layer 4. The leather layer 1 is disposed on a side of each soft layer 2 facing away from the hard layer 4. An RFID chip (not shown in the figure) and a communication coil (not shown in the figure) that are electrically connected to each other are disposed in the hard layer 4. The hard layer 4 may use any one of materials such as polyvinyl chloride (PVC), polyethylene terephthalate (PET), and polylactic acid (PLA).

A decorative sewing thread 5 is disposed on the leather layer 1, and a thread end 6 of the decorative sewing thread 5 is located on a side of the leather layer 1 facing the soft layer 2. An edge sealing layer (not shown in the figure) is disposed on an edge of the smart card, and the edge sealing layer is sealed by using a material such as polyurethane. The smart card may be edge-sealed by using an existing edge painting technique. This belongs to the prior art, and details are not described herein.

Optionally, the leather layer 1 is made of an artificial leather-like material such as polyurethane (PU), a leather pattern is pressed on the side of the leather layer 1 facing away from the soft layer 2, and a thickness of the leather layer 1 is 0.4 mm.

Embodiment 1

Figure 3:
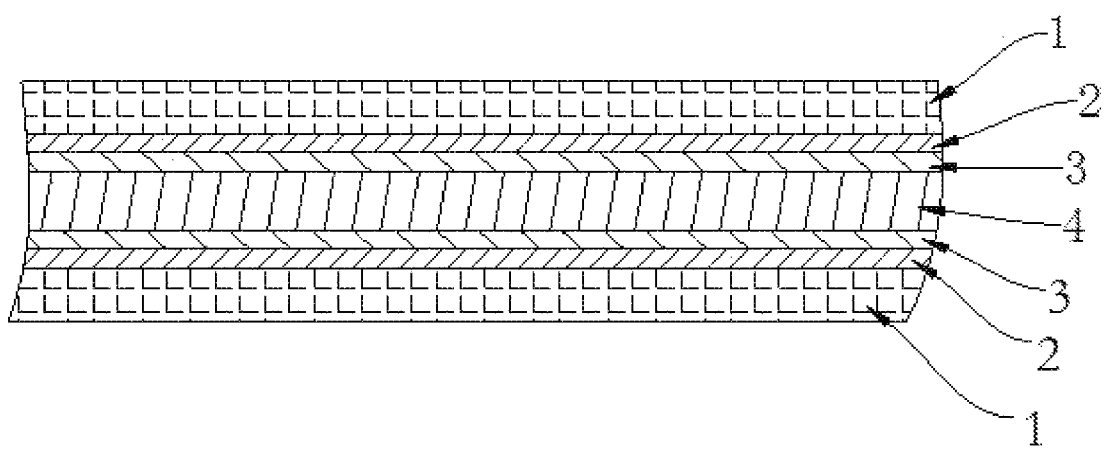
FIG. 3 is a sectional view of a leather smart card according to Embodiment 1 of the present application.

Referring to FIG. 1 and FIG. 3, a material of the soft layer 2 uses cotton fibers, a thickness of the soft layer 2 is 0.1 mm, an adhesive film layer 3 is further disposed between the soft layer 2 and the hard layer 4, the adhesive film layer 3 is made of a waterproof material such as a thermoplastic polyurethane elastomer rubber (TPU), and a thickness of the adhesive film layer 3 is 0.1 mm to 0.3 mm.

When the smart card in this embodiment is manufactured, decorative sewing is first performed on the leather layer 1. After the sewing is completed, a thread end 6 of a decorative sewing thread 5 faces the back side of the leather layer 1, and the RFID chip, the communication coil, and the like are disposed in the hard layer 4.

Then, the processed PU leather layer 1 with a thickness of 0.4 mm, the cotton fiber soft layer 2 with a thickness of 0.1 mm, the TPU adhesive film layer 3 with a thickness of 0.1 mm, and the processed PVC hard layer 4 (including the RFID chip and the communication coil) with a thickness of 0.4 mm are sequentially stacked, and laminated at 100° C. to 180° C. under 5 MPa to 13 MPa for 300 s to 2400 s. Preferably, a laminated steel plate is a steel plate with a leather pattern.

Then, the obtained material is die-cut to obtain a prototype of the smart card, and finally, a pattern, a character, or the like is printed on the prototype of the smart card. The prototype of the smart card is edge-sealed by using polyurethane to obtain a finished product of the smart card.

Embodiment 2

Figure 4:
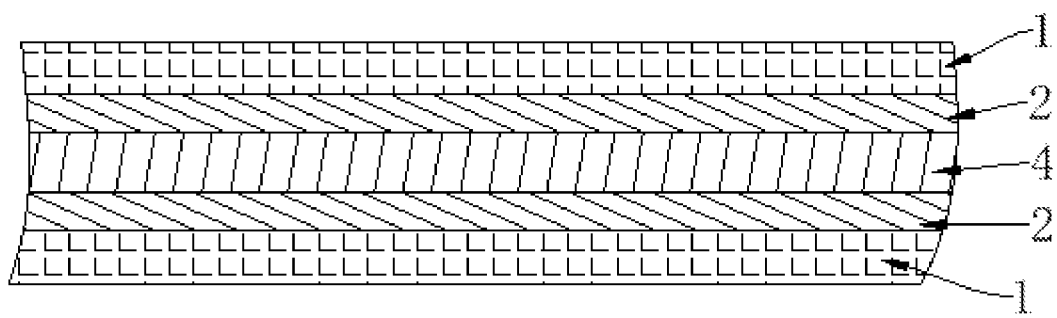
FIG. 4 is a sectional view of a leather smart card according to Embodiment 2 of the present application.

Referring to FIG. 4, a difference between this embodiment and Embodiment 1 lies in that the adhesive film layer 3 is canceled. Because an ethylene-vinyl acetate copolymer (EVA) material may further be used as a hot melt adhesive, when the smart card is pressed at a high temperature, the EVA material can be directly bonded to the hard layer. The soft layer 2 is made of the EVA material. The soft layer 2 has a thickness of 0.2 mm to 0.5 mm.

Finally, it should be emphasized that the foregoing descriptions are merely preferred embodiments of the present application, and are not intended to limit the present application. For a person skilled in the art, various variants and changes may be made to the present application. Any modification, equivalent replacement, or improvement made within the spirit and principle of the present application shall fall within the protection scope of the present application.

What is claimed is:

1. A leather smart card, comprising:
   a hard layer, wherein a radio frequency identification (RFID) chip and a communication coil are disposed in the hard layer, and the RFID chip is electrically connected to the communication coil;
   a leather layer and two soft layers, wherein the soft layers are disposed on two back-to-back sides of the hard layer, and the leather layer is disposed on a side of one of the soft layers, wherein the side of one of the soft layers faces away from the hard layer,
   wherein a material of at least one of the two soft layers comprises an ethylene-vinyl acetate copolymer, and a thickness of the at least one of the two soft layers is 0.2 mm to 0.5 mm.

2. The leather smart card according to claim 1, wherein a decorative sewing thread is disposed on the leather layer, and a thread end of the decorative sewing thread is located on a side of the leather layer, wherein the side of the leather layer faces the side of one of the soft layers.

3. The leather smart card according to claim 1, wherein an edge sealing layer is disposed on an edge of the leather smart card, and a material of the edge sealing layer comprises polyurethane.

4. The leather smart card according to claim 1, wherein a material of the hard layer comprises polyvinyl chloride, polyethylene terephthalate, or polylactic acid.

5. The leather smart card according to claim 1, wherein a material of the leather layer comprises polyurethane, and a thickness of the leather layer is 0.4 mm to 0.8 mm.

6. A leather smart card, comprising:
   a hard layer, wherein a radio frequency identification (RFID) chip and a communication coil are disposed in the hard layer, and the RFID chip is electrically connected to the communication coil;
   a leather layer and two soft layers, wherein the soft layers are disposed on two back-to-back sides of the hard layer, and the leather layer is disposed on a side of one of the soft layers, wherein the side of one of the soft layers faces away from the hard layer, wherein
   a material of at least one of the two soft layers comprises cotton fibers; and
   the leather smart card further comprises an adhesive film layer, and the adhesive film layer is located between the at least one of the two soft layers and the hard layer.

7. The leather smart card according to claim 6, wherein a material of the adhesive film layer comprises a thermoplastic polyurethane elastomer rubber.

8. The leather smart card according to claim 7, wherein a thickness of the at least one of the two soft layers is 0.1 mm; and
   a thickness of the adhesive film layer is 0.1 mm to 0.3 mm.

9. The leather smart card according to claim 6, wherein a decorative sewing thread is disposed on the leather layer, and a thread end of the decorative sewing thread is located on a side of the leather layer, wherein the side of the leather layer faces the side of one of the soft layers.

10. The leather smart card according to claim 6, wherein an edge sealing layer is disposed on an edge of the leather smart card, and a material of the edge sealing layer comprises polyurethane.

11. The leather smart card according to claim 6, wherein a material of the hard layer comprises polyvinyl chloride, polyethylene terephthalate, or polylactic acid.

12. The leather smart card according to claim 6, wherein a material of the leather layer comprises polyurethane, and a thickness of the leather layer is 0.4 mm to 0.8 mm.

\* \* \* \* \*